(12) United States Patent
Saes et al.

(10) Patent No.: US 10,660,177 B2
(45) Date of Patent: May 19, 2020

(54) POWER CONVERTER FOR LED FIXTURE

(71) Applicant: ELDOLAB HOLDING B.V., Son en Breugel (NL)

(72) Inventors: Marc Saes, Eindhoven (NL); Willem Johannes Maria Verbeek, Geldrop (NL)

(73) Assignee: ELDOLAB HOLDING B.V., Son en Breugel (NL)

( * ) Notice: Subject to any disclaimer, the term of this patent is extended or adjusted under 35 U.S.C. 154(b) by 0 days.

(21) Appl. No.: 15/781,878

(22) PCT Filed: Dec. 8, 2016

(86) PCT No.: PCT/NL2016/050854
§ 371 (c)(1),
(2) Date: Jun. 6, 2018

(87) PCT Pub. No.: WO2017/099594
PCT Pub. Date: Jun. 15, 2017

(65) Prior Publication Data
US 2018/0376552 A1 Dec. 27, 2018

(30) Foreign Application Priority Data
Dec. 8, 2015 (NL) ..................... 2015923

(51) Int. Cl.
*H05B 45/37* (2020.01)
*H05B 33/08* (2020.01)
(Continued)

(52) U.S. Cl.
CPC ............ *H05B 45/37* (2020.01); *H02M 3/335* (2013.01); *H02M 3/33507* (2013.01); *H05B 33/0818* (2013.01); *H05B 45/385* (2020.01)

(58) Field of Classification Search
CPC ............ H05B 33/0815; H05B 33/0845; H05B 33/0803; H05B 33/0806; H05B 33/0812;
(Continued)

(56) References Cited

U.S. PATENT DOCUMENTS 8,492,987 B2 * 7/2013 Nuhfer ............... H05B 33/0815
315/246
2011/0080110 A1 * 4/2011 Nuhfer ............... H05B 33/0815
315/291
(Continued)

OTHER PUBLICATIONS

Netherlands Search Report and Written Opinion of Application No. NL2015923, dated Sep. 13, 2016, 12 pages.
(Continued)

*Primary Examiner* — Tung X Le
*Assistant Examiner* — Borna Alaeddini
(74) *Attorney, Agent, or Firm* — RatnerPrestia

(57) ABSTRACT

A power converter for supplying an output voltage or an output current for powering an LED fixture is described, the power converter comprising:
a primary circuit comprising:
an input terminal for receiving a supply voltage;
a primary winding connected to the input terminal;
a secondary circuit comprising a secondary winding that is magnetically coupled with the primary winding for providing the output voltage or output current;
the power converter further comprising:
a sensor for measuring an electrical characteristic of the secondary circuit and;
a detector configured to determine an electrical characteristic of the supply voltage based on the measured electrical characteristic of the secondary circuit.

23 Claims, 5 Drawing Sheets

(51) Int. Cl.
*H02M 3/335* (2006.01)
*H05B 45/385* (2020.01)

(58) Field of Classification Search
CPC ............ H05B 33/0857; H05B 33/0884; H05B 33/08; H05B 33/0809; H05B 33/083; H05B 33/0842; H05B 33/0851; H05B 33/0854; H05B 33/089; H05B 37/02; H05B 37/0218; H05B 37/0227; H05B 37/0254; H05B 33/0818; H05B 45/37
See application file for complete search history.

(56) References Cited

U.S. PATENT DOCUMENTS

| | | | |
|---|---|---|---|
| 2011/0248640 A1 | 10/2011 | Welten | |
| 2011/0286247 A1 | 11/2011 | Keogh et al. | |
| 2011/0291583 A1* | 12/2011 | Shen | H05B 33/0815 315/287 |
| 2011/0309759 A1* | 12/2011 | Shteynberg | H05B 33/0815 315/201 |
| 2011/0316446 A1* | 12/2011 | Kang | H02M 3/33507 315/297 |
| 2012/0025729 A1* | 2/2012 | Melanson | H05B 33/0815 315/224 |
| 2012/0049752 A1* | 3/2012 | King | H05B 33/0815 315/210 |
| 2012/0112651 A1* | 5/2012 | King | H05B 33/0815 315/224 |
| 2013/0002156 A1* | 1/2013 | Melanson | H05B 33/0815 315/186 |
| 2014/0009067 A1 | 1/2014 | Saes | |
| 2015/0091462 A1 | 4/2015 | Levy | |
| 2015/0223303 A1* | 8/2015 | Hsia | H05B 33/0884 315/121 |

OTHER PUBLICATIONS

International Search Report and Written Opinion of International Application No. PCT/NL2016/050854, dated Mar. 2, 2017, 13 pages.
Linear Technology: "LT1725 General Purpose Isolated Flyback Controller," 2000, Milpitas, CA, pp. 1-28.
Ektoras Bakalakos, International Rectifier: Application Note AN-1195, "Primary Side Regulated LED Driver Using the IRS2983," Jan. 30, 2014, www.irf.com, pp. 1-30.

* cited by examiner

POWER CONVERTER FOR LED FIXTURE

FIELD OF THE INVENTION

The invention relates to the field of LED drivers, and more specifically to power converters, such as flyback converters, as applied in such LED drivers.

BACKGROUND OF THE INVENTION

LED drivers are widely used for powering various types of LED fixtures, including one or more LEDs. Typically, such an LED driver converts a supply voltage to an output voltage (typically a DC voltage) or output current for powering the LEDs of the LED fixture. In general, an LED driver is adapted to accommodate different types of supply voltages, such that it can be applied on different locations, e.g. where different types of supply voltages (e.g. different types of mains voltages) are used.

As an example, an LED driver can be adapted to be supplied with either a 230V, 50 Hz or a 277V, 60 Hz supply voltage. Further, an LED driver typically comprises a galvanic separation between the supply side (receiving the supply voltage) and the load side, where the LED fixture is connected to. To that extent, the LED driver can e.g. comprise a transformer, as e.g. used in a flyback converter. In general, LED lighting provides far more possibilities to generate a particular desired illumination (e.g. with respect to color or intensity), compared to conventional lighting, whereby color and intensity are typically controlled by controlling a current through the LED or LEDs of the LED fixture, i.e. on the load side. In general, it may be advantageous to know the type of supply voltage that is applied, e.g. to adjust or apply a certain control of the LED fixture. Such information could e.g. be stored (in a factory) in the memory of a controller provided on the load side of the LED driver. This would however render the application of the LED driver rather inflexible and maybe ineffective on locations where another type of supply voltage is provided. As an alternative, a communication means could be provided between the supply side and the load side (e.g. using an opto-coupler, thus maintaining the galvanic separation) to provide the necessary information to the load side. Such solutions however add to the complexity and thus costs of the LED driver.

SUMMARY OF THE INVENTION

It would be desirable to provide an LED driver whereby a characteristic of a supply voltage can be more easily assessed.

To address this, in a first aspect of the invention, there is provided a power converter for supplying an output voltage or an output current to an LED fixture for powering the LED fixture, the power converter comprising:
  a primary circuit comprising:
    an input terminal for receiving a supply voltage;
    a primary winding connected to the input terminal;
  a secondary circuit comprising a secondary winding that is magnetically coupled with the primary winding for providing the output voltage or output current;
  the power converter further comprising:
    a sensor for measuring an electrical characteristic of the secondary circuit and;
    a detector configured to determine an electrical characteristic of the supply voltage based on the measured electrical characteristic of the secondary circuit.

In accordance with the first aspect of the invention, a power converter is provided that is configured to supply an output voltage or current for powering an LED fixture.

In accordance with the present invention, the power converter comprises a primary circuit (having a primary winding) and a secondary circuit (having a secondary winding that is magnetically coupled to the primary winding), whereby the primary circuit is configured to receive a supply voltage (e.g. a mains supply voltage). The supply voltage may also be a DC voltage or a dimmer output voltage as e.g. provided by a triac dimmer or may even be an output voltage of an electronic transformer.

By means of the magnetically coupled primary and secondary winding, the supply voltage may be transformed to a suitable voltage or current for powering one or more LEDs of an LED fixture.

In accordance with the first aspect of the invention, the power converter is arranged to determine an electrical characteristic of the supply voltage (e.g. an amplitude or a frequency) as provided to the primary circuit based on a measurement performed on the secondary circuit. In order to determine the electrical characteristic of the supply voltage, the power converter according to the invention further comprises a sensor for sensing an electrical characteristic of the secondary circuit and a detection unit for determining the electrical characteristic of the supply voltage, based on the measured electrical characteristic of the secondary circuit.

Examples of electrical characteristics of the secondary circuit which may be suited are voltage, current, frequency, frequency content, waveform information including modulation aspects such as phase modulation (PM) or other types of modulation such as amplitude modulation (AM) or frequency modulation (FM), edge detection in case of the application of a Triac leading or trailing edge dimming, etc. In accordance with the present invention, the measured electrical characteristic is used to determine an electrical characteristic of the supply voltage. As will be explained in more detail below, when information about the supply voltage (e.g. frequency, amplitude AC or DC, etc.), is available on the secondary side, this may facilitate the control of the LED or LEDs of the LED fixture that is powered. Having knowledge about the type of supply voltage that is used to power the power converter may also enable an increased functionality in the controlling of the LED or LEDs, or may cause change in behavior of the driver, f.e. when supply is externally switched from mains to emergency source.

In an embodiment, the sensor is a current or voltage sensor, sensing a voltage or current of the secondary winding. A signal representing the voltage or current may, in an embodiment, be provided as an analogue signal to an input of the detection unit. In another embodiment, the signal may be provided as a digital signal.

In an embodiment, the primary and secondary windings are also galvanically separated or isolated.

In an embodiment, the primary circuit and the secondary circuit of the power converter are configured as a flyback converter. A flyback converter is often used as a power converter for an LED fixture because it applies, compared to a buck or boost converter, a transformer instead of a mere inductance, thus enabling to provide a galvanic separation between a primary side and a secondary side and, if required, a scaling of the supply voltage (provided on the primary side) to the output voltage (on the secondary side), the output voltage being applied to power the LED fixture. In general, a flyback converter as applied comprises a primary circuit and a secondary circuit, comprising a primary, respectively secondary winding, the windings being magnetically coupled and galvanically separated.

In such an embodiment, the primary circuit of the flyback converter may be provided with a rectifier (e.g. a full bridge or half bridge rectifier) in case of an AC supply voltage (such as a mains supply voltage) and a switch, e.g. connected in series with the primary winding, whereby the switch is typically controlled to operate at a switching frequency e.g. ranging between 80 and 1000 kHz, during operation. In case of the application of a rectified AC supply voltage, the primary circuit of the power converter may also include a buffer capacitor.

In an embodiment, the supply voltage as applied to the input terminal of the power converter can e.g. be or derived from a 230V, 50 Hz mains supply or a 277V, 60 Hz mains supply. In case of a flyback converter or an electronic transformer, the supply voltage may also be a DC supply voltage, which is, by means of the coupled primary and secondary circuit, transformed to a suitable level for powering an LED fixture or a further converter such as a Buck or Boost converter In an embodiment, the sensor is a current or voltage sensor, sensing a voltage or current of the secondary winding. A signal representing the voltage or current may, in an embodiment, be provided as an analogue signal or as a digital signal, to an input of the detection unit.

In an embodiment, the detector may comprise an analogue detection circuit to e.g. determine an amplitude of the supply voltage as applied to the input terminal. As an alternative, a digital detection circuit may be applied as well. In the latter case, a signal representative of either the voltage or current associated with the secondary circuit may e.g. be sampled and processed using a microprocessor or the like, in order to determine an amplitude and/or frequency of the supply voltage on the primary side. In case the primary circuit comprises a switch (e.g. in case the power converter is a flyback converter or an electronic transformer), the switching frequency may be determined as well from the sampled signal by the microprocessor.

Using the switching frequency, the detector may e.g. be configured to determine whether or not the supply voltage is an AC voltage or a DC voltage. In case the supply voltage is an AC supply voltage, the switching frequency changes during a period of the AC supply voltage, as will be illustrated below. In case the supply voltage is a DC supply voltage, the switching frequency of the switch will substantially remains the same. As such, in an embodiment of the present invention, the power converter can be configured to detecht a changed supply, e.g. a change from a supply by means of an AC supply voltage to a supply by means of a DC supply voltage. When such a change is detected, the power converter may e.g. be configured to exhibit a certain, predetermined behavior. As an example, the power converter may e.g. be configured to adjust the output power of the converter upon detection of the changed supply voltage. As a particular example, in case of an emergency, it may be convenient to switch from a mains AC power supply to a DC power supply. As such a DC power supply may only enable powering for a limited amount of time, it might be worth to economize on the power consumed by the LED fixture that is powered. As, upon detection of a switch to a DC power supply, the power converter according to the present invention may e.g. be configured to reduce the power supplied to the LED fixture.

In an embodiment, the supply voltage characteristic is determined based on a determined switching frequency combined with a characteristic of the load, i.e. the power consumed by the LED fixture.

In an embodiment, the secondary circuit comprises an auxiliary winding, magnetically coupled with the primary winding, the sensor being adapted to measure a voltage of the auxiliary winding as the electrical characteristic of the secondary circuit. In such arrangement, a scaling down of a sensed voltage for determining the supply voltage characteristic may be avoided by appropriate selection of the number of turns of the auxiliary winding.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
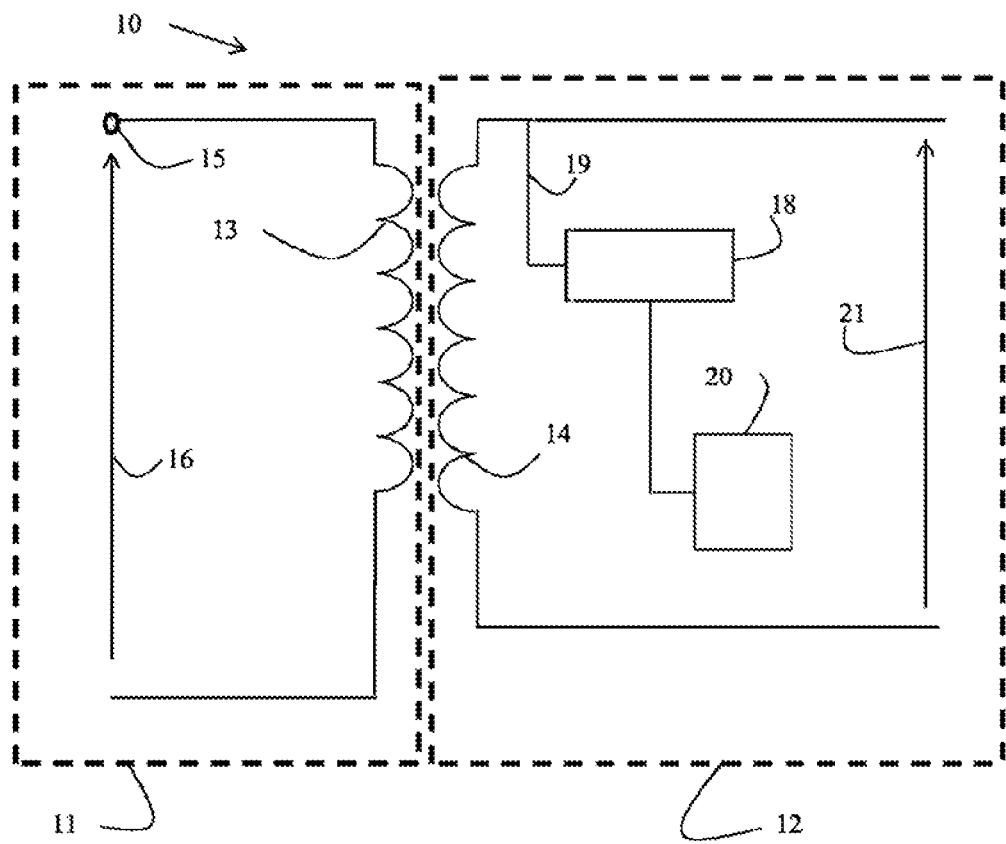
FIG. 1 depicts a power converter according to a first embodiment of the present invention.

FIG. 1 depicts an embodiment of a power converter according to the present invention. FIG. 1 schematically depicts a power converter 10 comprising a power converter having a primary circuit 11 and a secondary circuit 12, comprising a primary 13 respectively secondary winding 14 that are magnetically coupled (thus forming a transformer 13,14). Optionally, the primary circuit and the secondary circuit are galvanically separated. The primary circuit 11 further comprises an input terminal 15 for receiving a supply voltage 16, e.g. an AC mains voltage. The secondary circuit 12 as shown further comprises a sensor 18 for sensing an electrical characteristic of the secondary circuit 12. In the embodiment as shown, the sensor 180 is arranged to determine an electrical characteristic of the secondary winding 14 of the secondary circuit 12 (as schematically indicated by the line 19). As an example, the sensor 18 can be arranged to measure the voltage over the secondary winding 14 or the current through the secondary winding 14. In accordance with the present invention, the sensor 18 need not determine an electrical characteristic of the secondary winding 14, but may also determine an electrical characteristic of another component of the secondary circuit as well. As an example (see also further on), the secondary circuit 12 can be provided with an auxiliary winding (not shown in FIG. 1) that is magnetically coupled with, and optionally galvanically separated from the primary winding 13. In such embodiment, the sensor 18 can be arranged to determine an electrical characteristic (e.g. a voltage or current) of the auxiliary winding.

In the embodiment of FIG. 1, the sensor 18 is arranged to provide a signal representing the electrical characteristic of the secondary circuit 12 to a detector 20. In accordance with the present invention, the detector 20 is configured to determine an electrical characteristic of the supply voltage 16 based on the measured electrical characteristic of the secondary circuit, i.e. as measured by the sensor 18.

As an example, the detector can be configured to determine a frequency and amplitude of the supply voltage provided to the primary winding. Such information may be useful to determine in what geographical region the power converter is applied, thus facilitating taking into account possible regulations that apply in that particular region. As an example, in some installations as applied in US, there may be power limitations imposed on illumination systems. When it is recognised that the power converter is applied in such geographical region, e.g. by determining the amplitude and/or frequency of the primary side supply voltage using the detector 20 provided on the secondary side, such limitations can be taken into account.

Having knowledge about the frequency of the supply voltage (in case of an AC- or rectified AC voltage) may also be advantageously used to select an appropriate modulation cycle or period for controlling illumination characteristics of an LED or LEDs of the LED fixture that is powered. Typically, illumination characteristics such as intensity or color of the LEDs of an LED fixture are controlled by providing a substantially constant current to the LEDs at a controllable duty cycle. In particular, during a predetermined period (referred to as the modulation cycle or period), the current is provided to the LED during a fraction (referred to as the duty cycle) of said period. Typically, such a modulation period may be a few ms. The appropriate selection of the modulation period is important to avoid aliasing effects. In particular, it may be advantageous to select the modulation period such that the period of the supply voltage (e.g. 20 ms in case of a 50 Hz supply or 16.67 ms in case of a 60 Hz supply) is a multiple of the modulation period. By doing so, interferance effects and aliasing effects, e.g. when the driven LEDs are observed by capturing systems such as video cameras or television cameras, may be avoided.

In an embodiment, a modulation cycle or period of 3.33 msec may be advantageously be applied since both a 50 Hz period and a 60 Hz period are multiples of such modulation period. When a fixed modulation period is applied, this may e.g. imply that an illumination set point, e.g. a desired color or intensity may be adjusted at the same rate, i.e. determined by the modulation period.

In an embodiment, the power converter 10 comprises, as part of the secondary circuit 12, a controller such as a microprocessor or microcontroller for controlling an LED fixture that is powered using an output voltage 21 as provided by the secondary winding 14.

In an embodiment, the detector 20 may be incorporated into a controller controlling the LED fixture.

Figure 2:
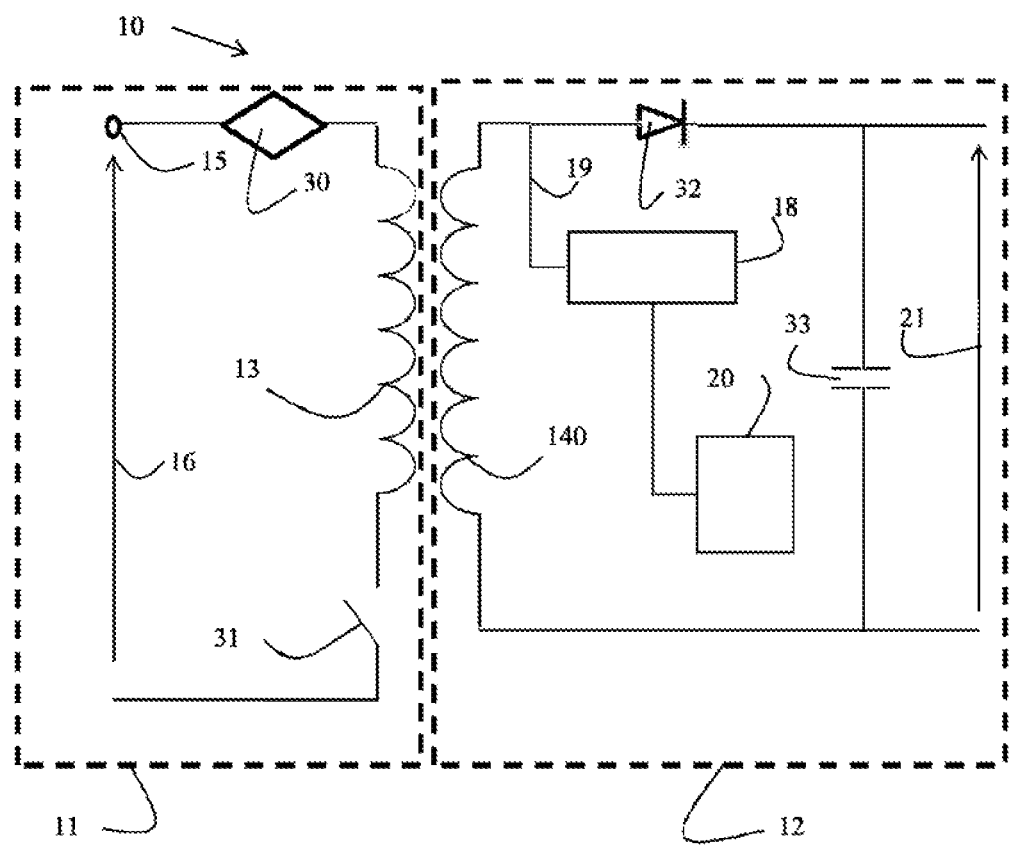
FIG. 2 depicts a power converter according to a second embodiment of the present invention.

In FIG. 2, another embodiment of a power converter according to the present invention is schematically shown. In the embodiment, the power converter is configured as a flyback converter. Compared to the embodiment of FIG. 1, the primary circuit 11 is further provided with a rectifier 30 (e.g. a full bridge or half bridge rectifier) for rectifying the supply voltage 16 (e.g. an AC mains voltage). The primary circuit 11 further comprises a switch 31 (e.g. a power FET) for connecting/disconnecting the primary winding 13 of the transformer (13,14) with the supply voltage 16. During use, the switch is e.g. controlled by a standard flyback regulator. The secondary circuit of the flyback configuration is provided with a biasing diode 32 and a buffer capacitance 33. By controlling the switching of switch 31, the output voltage 21 of the secondary circuit 12 can be controlled.

Figure 3:
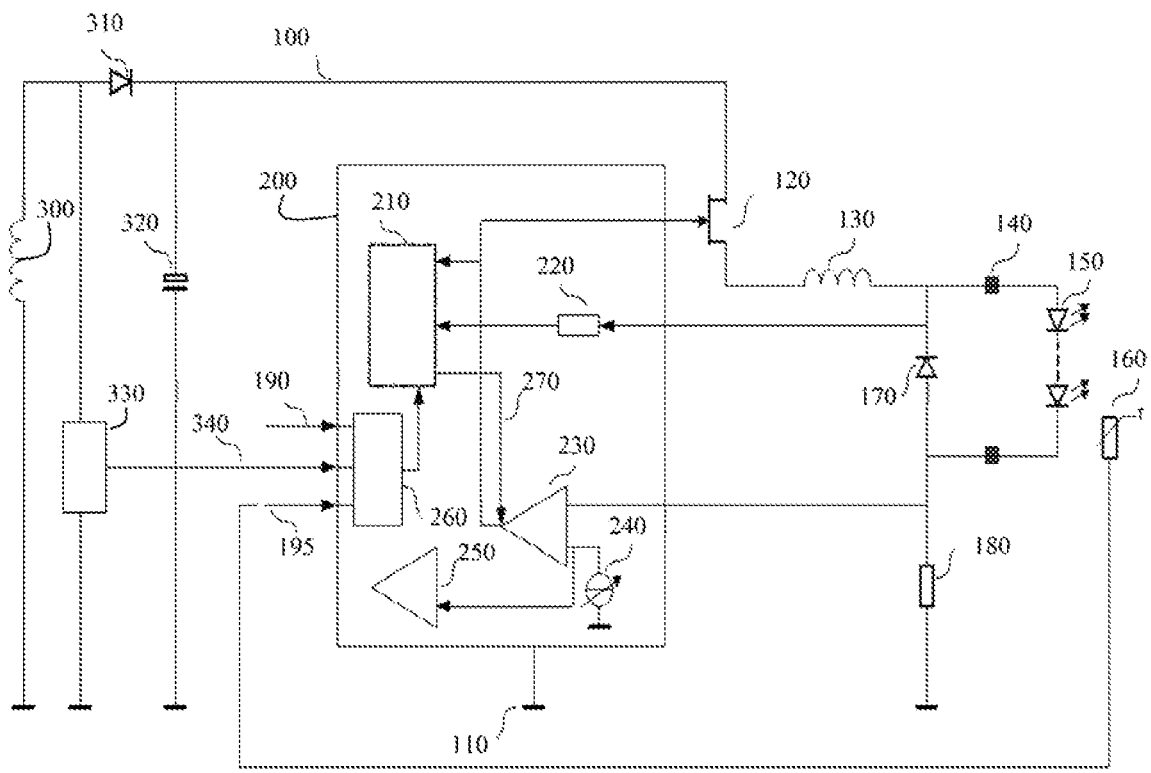
FIG. 3 depicts an LED fixture and an LED driver for controlling a current supplied to the LED driver, including a secondary circuit of a power converter according to the present invention.

In FIG. 3, a more detailed embodiment of a secondary circuit as can be applied in a power converter according to the present invention is schematically shown, including an LED fixture 140,150.

In FIG. 3, a sensor 330 is schematically shown that transforms the voltage across the secondary winding 330 into a signal 340 that is provided to an input terminal 260 of a microcontroller 200.

The microcontroller 200 comprises a processing unit 210 which can operate as a detector for determining an electrical characteristic of the primary winding (not shown).

In an embodiment, signal 340 can for example be a scaled down copy (scaled down by the sensor 330) of the voltage across the secondary winding 300, scaled down to fit the range of the input terminal 260. The signal may subsequently be converted to a digital signal by an A/D converter, e.g. provided in the input terminal 260. The digital signal may then be provided to the processing unit 210 where it is processed to derive an electrical characteristic of the supply voltage as supplied to the primary winding. As an example, the processing unit 210 may be adapted to count edges in the digital signal as provided. Such counting can, as an example, be implemented in software or by using an internal hardware counter of the processing unit 210.al can be counted, either in SW or by an internal HW counter in the uC.

In another embodiment, the input terminal 260 is an analogue input supplying the signal 340 to an analog input of the processing unit 210 where the signal is e.g. sampled. The sampled signal may then be processed using the software available on the processing unit 210 to determine electrical characteristics of the supply voltage such as a switching frequency of the power switch (such as switch 31 of FIG. 2) or an envelope of the supply voltage which can be used to derive a main frequency (e.g. 100 or 120 Hz) of the supply voltage.

In another embodiment, the voltage across the secondary winding may be clamped and the clamped voltage is fed to a digital input of the processing unit 210 and processed using an internal hardware counter, or sampled in an analog sense and characterized using the processing unit's software.

As an alternative to processing a signal representative of the voltage across the secondary winding 300, a signal representative of the current through the secondary winding, e.g. derived from a voltage across a small measuring resistor in series with the winding or via another current measuring method, may be applied as well for determining an electrical characteristic of the supply voltage.

In order to power a power converter, various types of voltage can be used to derive the supply voltage such as supply voltage 16 of FIG. 1. Table 1 provides an overview:

TABLE 1

| Voltage | Frequency | Region | Remarks |
| --- | --- | --- | --- |
| 277 V | 60 Hz | US | |
| 230 V | 50 Hz | Europe | |
| 120 V | 60 Hz | US | |
| 120 V/240 V | DC | | |
| Square wave | 100 Hz/120 Hz | | May be full block or HNL block |
| Triac modulated | | | Both amplitude and and phase angle information |

In case the applied voltage is an AC voltage, the AC component may be detected by the power converter according to the present invention. In case the supply voltage is derived from a Triac modulated AC voltage, the phase angle (leading or trailing) as applied may, in an embodiment of the present invention, be derived from a measurement on the secondary circuit as well. FIG. 3 further schematically depicts a converter for controlling a current as supplied to the LED fixture 140, 150. In the embodiment shown, the converter comprises a switch 120, an inductance 130 and a freewheeling diode 170. By means of resistance 180, a signal may be derived (i.e. the voltage over resistance 180) which is representative of the current supplied to the LED fixture, the signal may be provided to a comparator 230 where the signal is compared to a variable voltage 240 which may be set in accordance with a desired set point.

In an embodiment, an electrical characteristic of the supply voltage is determined using an electrical characteristic of the secondary circuit and a load characteristic. As an example of the latter, the current as supplied to an LED fixture or a forward voltage over an LED fixture can be mentioned.

Figure 4:
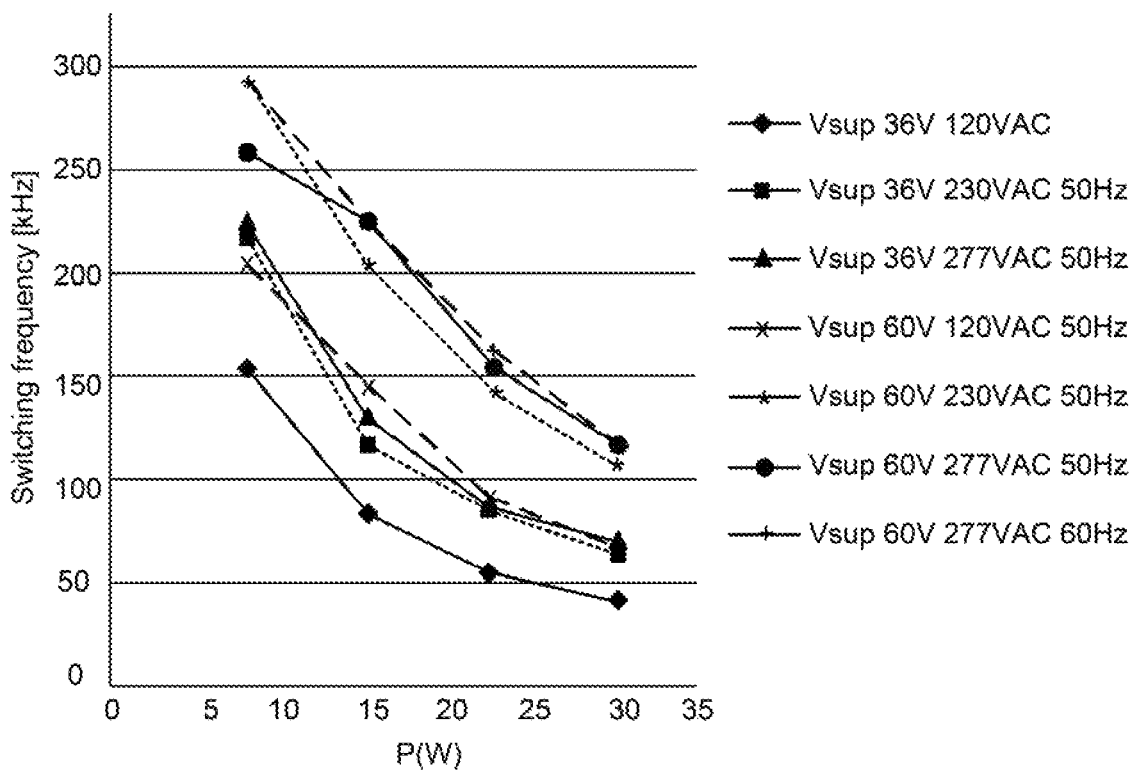
FIG. 4 depicts a variation of a switching frequency as a function of the load represented by the LED fixture, for different input/output voltage combinations.

In an embodiment, an electrical characteristic of the supply voltage (e.g. an amplitude of the supply voltage) is determined based on a switching frequency as observed in the secondary circuit (e.g. in a voltage across a secondary or auxiliary winding of the secondary circuit). It has been observed that the switching frequency of a power switch (such as switch 31 of FIG. 2) of a flyback converter varies, depending on the applied supply voltage. In addition, the switching frequency has been found to vary depending on the load that is powered. This is illustrated in FIG. 4, where different graphs are shown indicating the switching frequency as a function of the load (power P consumed by the LED fixture) for various types of input/output voltage combinaties. FIG. 4 shows graphs for input voltages of 120 V AC (50 Hz), 230 V AC (50 Hz) and 277 V AC (50 Hz) and for DC output voltages of 36 V and 60 V. As can be seen, when the type of DC output voltage (i.e. the supply voltage on the secondary side supplying the LED fixture) and the load are know, this information, combined with a determined switching frequency, can be used to assess the type of supply voltage provide at the input of the power converter (i.e. the AC input voltage).

It may further be pointed out that similar considerations may be applied when the supply voltage on the primary side is a DC voltage. In such case, one may also, by detection of e.g. the switching frequency (e.g. using one of the circuits as discussed in more detail below) and the load (e.g. based upon measurements of the DC output voltage and load current towards the LED fixture), one may determine a characteristic, e.g. an amplitude, of the DC voltage as applied on the primary side.

In an embodiment, information indicating the type of AC or DC supply voltage as a function of the switching frequency and the load may be stored in a memory unit of the power converter, e.g. a memory unit of a control unit of the power converter.

In the following figures, different types of sensor/detector combinations are discussed which may be applied in the power converter according to the present invention. These different types of sensor/detector combinations are applied on the secondary circuit of the power converter according to the present invention and enable to determine one or more electrical characteristics of the supply voltage provided on the primary side, based on measured electrical characteristics on the secondary side.

Figure 5A:
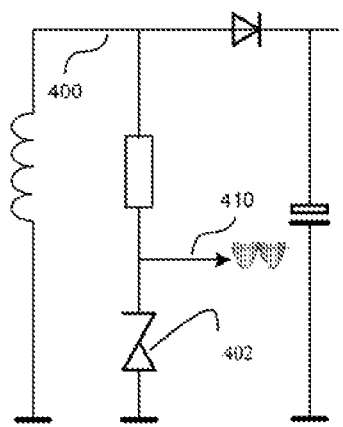
FIGS. 5a-7 schematically show various sensing circuits as can be applied in a power converter according to the present invention.
Figure 5B:
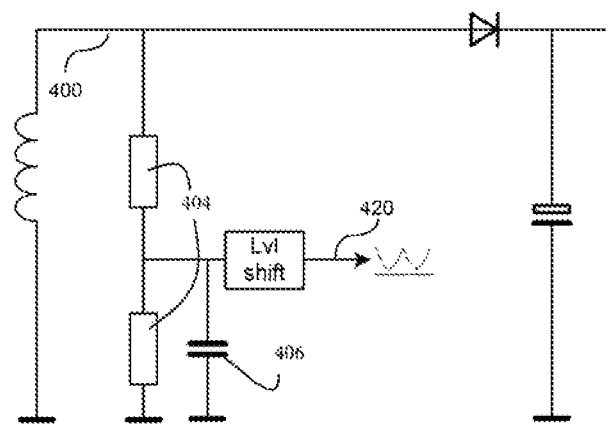
Figure 5C:
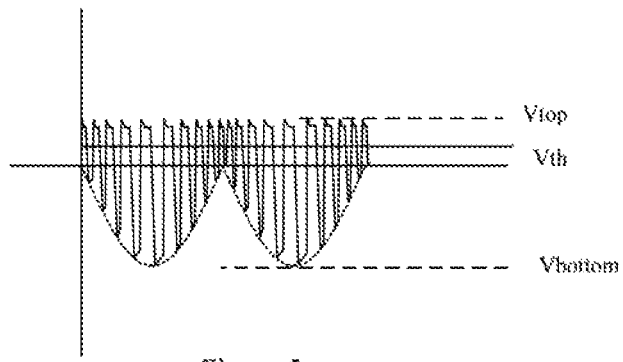

FIGS. 5a and 5b schematically show analogue circuits which can be applied as sensing circuits in the present invention. Reference number 400 represents a voltage over either the secondary winding or an auxiliary winding of the secondary circuit. In the embodiment as shown, a switching operation at a switching frequency (e.g. using a switch such as switch 31 of FIG. 2) is assumed, as can be seen from signal 410 which is derived from the voltage 400. FIG. 5c shows in more detail the voltage 410 over diode 402, which can be used as an input signal for a detector, not shown. In the example as shown, the signal 410 is typical in case of an AC supplied flyback converter, as e.g. described in FIG. 2. The switching behavior of the switch of the flyback converter can be observed in the secondary voltage 400, i.e. the voltage across the secondary winding or across an auxiliary winding of the secondary circuit. Using the voltage 410, an amplitude of the supply voltage provided on the primary side may be derived based on a determination of Vbottom as shown, in combination with number of turns ratio of the windings applied. Further, using a comparison between to voltage 410 and a voltage Vin as shown, the switching behavior of the switch can be determined, and thus the switching frequency can be determined. As can be seen from the detailed voltage 410 in FIG. 5c, the switching frequency is not constant during a period of the AC supply voltage. More specifically, the switching frequency is highest at or near a zero-crossing of the voltage 400 or 410.

In an embodiment of the present invention, the detector of the power converter is configured to assess a variation of the switching frequency of the switch, e.g. based upon the voltage 410. By determining the instants when the voltage signal 410 crosses the threshold voltage Vth, the detector can determine the switching frequency and also the variation (if any) of the switching frequency. Using such an assessment of the switching frequency, in particular the assessment of whether or not there is a variation in the switching frequency during a period of the supply voltage, the detector may e.g. be configured to determine whether or not the supply voltage is an AC voltage or a DC voltage. In case the supply voltage is an AC supply voltage, the switching frequency will change during a period of the AC supply voltage. In case the supply voltage is a DC supply voltage, the switching frequency of the switch will substantially remains the same. As such, in an embodiment of the present invention, the power converter can be configured to detect a change in the supply voltage, e.g. a change from a supply by means of an AC supply voltage to a supply by means of a DC supply voltage. When such a change is detected, the power converter may e.g. be configured to exhibit a certain, predetermined behavior. As an example, the power converter may e.g. be configured to adjust the output power of the converter upon detection of the changed supply voltage. As an example, when an AC power supply is interrupted, e.g. due to a calamity or the like, the powering of the power converter may e.g. be switched to an emergency DC supply. When such a switch is made, the power converter according to the present invention may be configured to detect, e.g. based upon an assessment of the switching frequency, such a change from an AC supply to a DC supply and reduce the output power, in order to economize on the power consumption of the DC supply.

In an embodiment, the detector as applied in the power converter according to the present invention may be configured to substantially continuously monitor the switching frequency. Alternatively, the assessment of the switching frequency may occur at predetermined intervals. When assessing the switching frequency, the detector as applied may e.g. be configured to determine a maximum switching frequency and a minimum frequency with a certain, predetermined period. As an example, such a predetermined period may be 10 msec or 8.333 msec, i.e. half the period of a 50 Hz or 60 Hz frequency, and assess whether or not there is a noticeable variation in the switching frequency within the predetermined period. Such a period may also be taken equal to the modulation period or cycle as described above. Typically, as described above, there will be no adjustment made to the required or desired illumination set point during the modulation cycle. As such, when assessing the switching frequency during the modulation cycle, there will be no substantial disturbances of the switching frequency, e.g. due to a changed illumination set point.

FIG. 5b schematically shows another sensing circuit including a voltage divider 404 and capacitance 406 for determining a signal 420 representing an envelope of the voltage 400. As shown, a level shift (Lvl shift) may be applied as well to generate the signal 420 used for detecting the electrical characteristic of the supply voltage. The signal 420 may e.g. be provided to a detector to assess whether or not the supply voltage is an AC supply voltage (in which case a variation in the signal 420 can be noticed) or a DC supply voltage (in which case the signal 420 is substantially constant). The detector may also be configured to determine, in case of an AC supply voltage, the frequency of the AC supply voltage, e.g. by determining the period between two minima of the signal 420. By appropriate dimensioning of the voltage divider 404 and capacitance 406, one can ensure that the switching behavior of the switch on the primary side is filtered out, while at the same time still enabling the observation of a variation of the mains supply, in case of an AC supply on the primary side.

Figure 6:
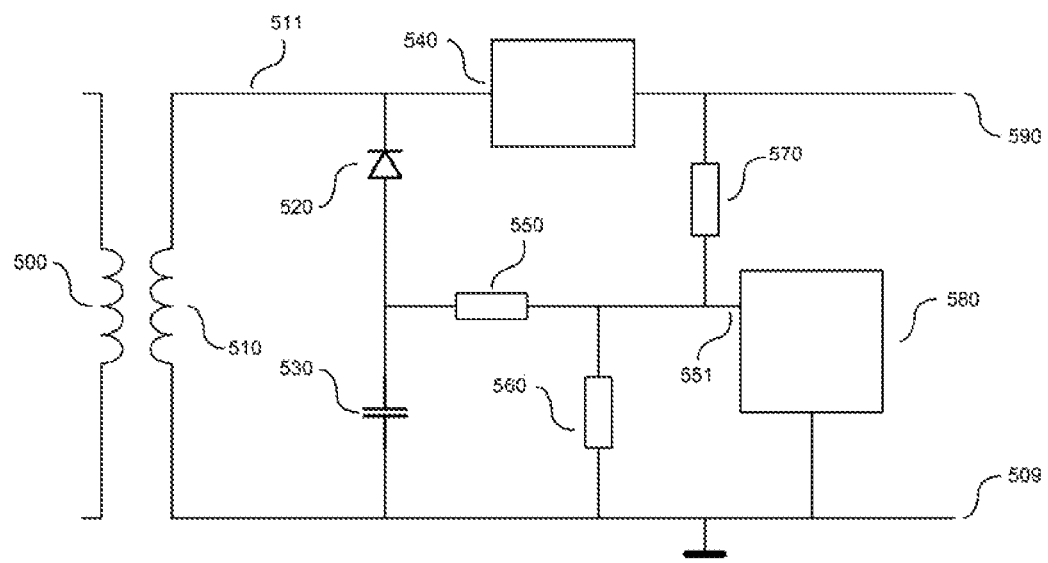

In FIG. 6, yet another sensing circuit is shown which can be applied to sense or measure an electrical characteristic of the secondary circuit of the power converter. FIG. 6 schematically shows a primary winding 500 of the primary circuit and a winding 510 of the secondary circuit. Voltage 511 over the winding 510 is brought, in an amended form 551 to a terminal of detector 580, which can e.g. include a microprocessor or the like to derive an electrical characteristic of the supply voltage applied on the primary side, e.g. over winding 500. As shown, a voltage divider circuit including diode 520, capacitance 530 and resistors 550, 560 and 570 are used to convert the voltage 511 to the input voltage 551 of the detector 580; resistors 550 and 560 can be applied to appropriately scale the voltage, e.g. between −5 and 0 Volt, whereas resistor 570 acts as a pull-up resistor to pull up the voltage to a voltage between 0 and 5 V. In the arrangement as shown, the detector 580 may be an analogue detector detecting the amplitude and mains frequency of the voltage supplied on the primary side. Capacitor 530 will act, in such arrangement, as a filter for filtering a switching frequency when such frequency is present in the voltage 511.

Figure 7:
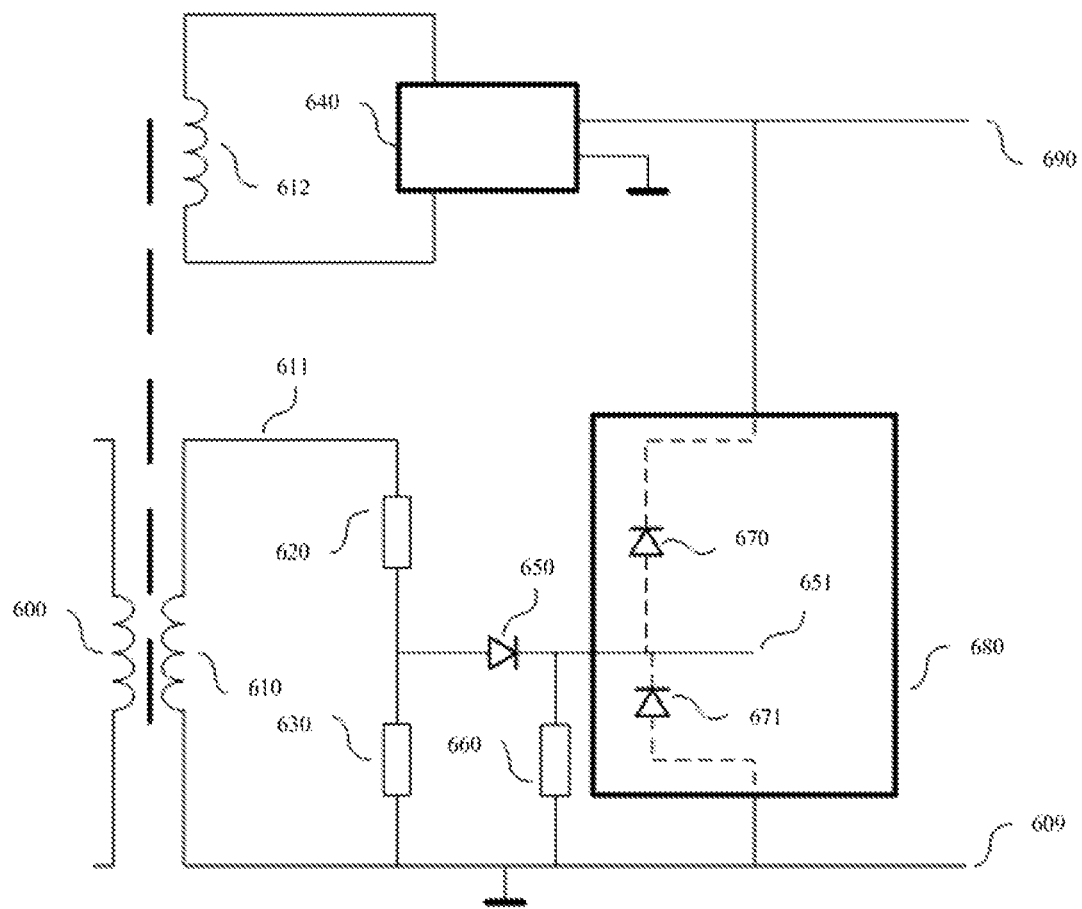

In FIG. 7, yet another sensor or sensing circuit is shown as can be applied in a power converter according to the present invention. In the embodiment as shown, a primary winding 600 is magnetically coupled with a secondary winding 612 and an auxiliary winding 610, the auxiliary winding enabling a characterization of the mains supply: A voltage 611 over the auxiliary winding 610 is applied to a detector 680, typically a microcontroller, a microprocessor or the like. The voltage 611 over the auxiliary winding is applied, via voltage divider 620, 630 and diode 650 to an input 651 (e.g. a digital input pin of the detector 680). Voltage divider 620, 630 may e.g. be an impedance divider (typically consisting of resistors) to match the voltage 611 to a range that is acceptable by the detector 680. In the circuit as shown, diode 650 is applied to pull the voltage on input 651 high and not low. A resistor 660 is applied to pull the voltage on input 651 down when diode 650 is not conducting. Note that resistor 680 may be external or internal to the detector 680. FIG. 7 further shows a pair of limiting diodes 670, 671 to keep the voltage on input 651 substantially within the range acceptable to the input pin 651. In case the input pin 651 is a digital input pin of the detector or microcontroller 680, a counter in the microcontroller may then be applied to count pulses occurring on input 651 during a certain period, thereby deriving the frequency of the mains supply voltage applied to the primary winding 600.

In an embodiment, the sensor/detector combination as applied on the secondary side of the power converter may be configured to detect when the power supply on the primary side is temporarily disconnected during a predetermined period. In such an embodiment, the sensor/detector combination may e.g. be configured to detect such a temporary disconnect in a range between 1 msec and 5 msec. In order to realize such a disconnect, the primary side of the power converter may be equipped with a dedicated switch to realize such an interrupt of the power supply. Alternatively, the infrastructure where the power converter and LED fixture are applied may be equipped with such a switch as well, e.g. arranged in a wall socket. Upon detection of such an interrupt, e.g. detected by a circuit as described above, the power converter according to the present invention may exhibit a particular, predetermined behavior. As an example, the power converter may be configured to reduce the output power with a predetermined amount, each time such an interrupt of the supply voltage is detected. Starting from a nominal output power, the power converter may e.g. be configured to reduce the output power with 25% of the nominal power, each time a power interrupt having a predetermined duration, is detected.

In a more general manner, the power converter according to the present invention may be configured to have a plurality of predetermined illumination set points (e.g. characterized by an illumination intensity and a desired color) stored in a memory unit and may be configured to apply these set points consecutively when power interrupts are detected.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfill the functions of several items recited in the claims.

The invention claimed is:

1. A power converter for supplying an output voltage or an output current for powering an LED fixture, the power converter comprising:
    a primary circuit comprising:
        an input terminal for receiving a mains supply voltage; and
        a primary winding connected to the input terminal;
    a secondary circuit comprising a secondary winding that is magnetically coupled with the primary winding for providing the output voltage or output current, wherein the primary circuit and the secondary circuit are configured as a flyback converter;
    a sensor for measuring an electrical characteristic of the secondary circuit, the sensor being configured to measure a voltage across the secondary winding of the secondary circuit as the electrical characteristic of the secondary circuit; and
    a detector configured to determine a frequency of the mains supply voltage as an electrical characteristic of the mains supply voltage based on the measured electrical characteristic of the secondary circuit.

2. The power converter according to claim 1, wherein the secondary winding is galvanically separated from the primary winding.

3. The power converter according to claim 1, wherein the primary circuit further comprises a switch, connected in series with the primary winding, the switch being configured to operate, during use, at a switching frequency.

4. The power converter according to claim 3, wherein the detector is adapted to determine the switching frequency of the switch and determine an amplitude and frequency of the mains supply voltage based on the determined switching frequency.

5. The power converter according to claim 4, wherein the detector is adapted to determine the amplitude and frequency of the mains supply voltage based on a determined switching frequency, an output voltage for powering the LED fixture and a load of the LED fixture.

6. The power converter according to claim 1, wherein the detector is further configured to determine an amplitude of the mains supply voltage based on the measured electrical characteristic of the secondary circuit.

7. The power converter according to claim 1, wherein the winding across which the sensor measures the voltage is the secondary winding.

8. The power converter according to claim 1, wherein a winding across which the sensor measures the voltage is an auxiliary winding magnetically coupled with the primary winding, the sensor being adapted to measure a voltage of the auxiliary winding as the voltage.

9. The power converter according to claim 1, further comprising a control unit for controlling the output current for powering the LED fixture.

10. The power converter according to claim 9, wherein the control unit is configured to output a control signal for modulating the output current according to a modulation cycle.

11. The power converter according to claim 10, wherein the control unit is configured to determine the modulation cycle based on the frequency of the mains supply voltage.

12. The power converter according to claim 1, wherein the detector is configured to detect a change in the frequency of the mains supply voltage.

13. The power converter according to claim 12, wherein the detector is further configured to detect a change in the mains supply voltage based upon a change from a supply of an AC supply voltage to a supply of a DC supply voltage.

14. The power converter according to claim 13, wherein a control unit is configured to reduce an output power of the power converter when the change from the AC supply voltage to the DC supply voltage is detected.

15. The power converter according to claim 1, wherein the detector is configured to determine a phase angle of the mains supply voltage based on the sensed voltage, by means of edge detection.

16. The power converter according to claim 15, wherein the power converter is configured to adjust the output current based on the determined phase angle.

17. The power converter according to claim 1, wherein the detector is configured to determine a temporary interrupt of the mains supply voltage during a predetermined period.

18. The power converter according to claim 17, wherein the predetermined period is within the range of 1 msec to 5 msec.

19. The power converter according to claim 17, wherein a control unit is configured to adjust an output power of the power converter when the mains supply voltage is removed during the predetermined period.

20. The power converter according to claim 1 wherein the sensor is further adapted to measure a current through the secondary winding as the electrical characteristic of the secondary circuit.

21. The power converter according to claim 1, wherein the sensor is adapted to provide the measured electrical characteristic to an input terminal of the detector.

22. The power converter according to claim 1 wherein the detector further comprises an A/D converter for converting the provided measured electrical characteristic to a digital signal.

23. The power converter according to claim 1 wherein the detector is adapted to determine an amplitude of the supply voltage as provided to the input terminal of the power converter.

* * * * *